(12) United States Patent
Harish

(10) Patent No.: US 11,501,290 B2
(45) Date of Patent: Nov. 15, 2022

(54) DIGITAL CURRENCY TRANSFER

(71) Applicant: INTERNATIONAL BUSINESS MACHINES CORPORATION, Armonk, NY (US)

(72) Inventor: Vishruth Harish, Halifax (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 16/505,042

(22) Filed: Jul. 8, 2019

(65) Prior Publication Data

US 2021/0012325 A1    Jan. 14, 2021

(51) Int. Cl.
*G06Q 20/36*    (2012.01)
*G06Q 20/40*    (2012.01)
*G06Q 20/38*    (2012.01)

(52) U.S. Cl.
CPC ..... *G06Q 20/3674* (2013.01); *G06Q 20/3676* (2013.01); *G06Q 20/3829* (2013.01); *G06Q 20/403* (2013.01); *G06Q 20/407* (2013.01)

(58) Field of Classification Search
CPC ........... G06Q 20/3674; G06Q 20/3676; G06Q 20/3829; G06Q 20/403; G06Q 20/407
See application file for complete search history.

(56) References Cited

U.S. PATENT DOCUMENTS

| | | | |
|---|---|---|---|
| 10,102,510 B2 | 10/2018 | Yau et al. | |
| 10,803,463 B1 * | 10/2020 | Barnum | G06Q 20/3276 |
| 10,915,895 B1 * | 2/2021 | Fogg | G06Q 20/38215 |
| 2015/0227897 A1 | 8/2015 | Loera | |
| 2015/0324789 A1 * | 11/2015 | Dvorak | H04W 12/06 705/67 |

(Continued)

FOREIGN PATENT DOCUMENTS

WO    WO-2020004859 A1 *    1/2020    ............. G06Q 20/38

OTHER PUBLICATIONS

Anon, "Electronic equivalent for paper currency for use in everyday", IP.com No. IPCOM000226290D, Mar. 26, 2013, 3 pgs.

(Continued)

*Primary Examiner* — Neha Patel
*Assistant Examiner* — Courtney P Jones
(74) *Attorney, Agent, or Firm* — Rakesh Roy; Matthew M. Hulihan; Heslin Rothenberg Farley & Mesiti PC

(57) ABSTRACT

Digital currency transfer is facilitated by a process that includes receiving an indication of a type and amount of digital currency to be transferred to a recipient as part of a digital currency transfer, and a specified public key of the recipient. The public key identifies a digital permanent wallet of the recipient's account. The process creates and stores a digital temporary wallet to temporarily hold the digital currency. This creates a transaction key uniquely identifying the digital currency transfer, and associates with the digital temporary wallet the transaction key and the public key. The process transfers the digital currency from the digital permanent wallet of the sender to the digital temporary wallet, and sends temporary wallet information of the digital temporary wallet, including the transaction key, for embodiment in a physical wallet to hold the digital currency and to be printed and transferred to the recipient.

20 Claims, 10 Drawing Sheets

(56) References Cited

U.S. PATENT DOCUMENTS

| | | | | |
|---|---|---|---|---|
| 2016/0071110 | A1* | 3/2016 | Lazay | G06Q 20/10 |
| | | | | 705/44 |
| 2016/0335628 | A1* | 11/2016 | Weigold | G06Q 20/3829 |
| 2017/0053249 | A1 | 2/2017 | Tunnell et al. | |
| 2018/0060860 | A1 | 3/2018 | Tian et al. | |
| 2018/0101829 | A1 | 4/2018 | Narasimhan et al. | |
| 2018/0204191 | A1* | 7/2018 | Wilson | H04L 9/3242 |
| 2019/0080406 | A1* | 3/2019 | Molinari | G06Q 40/02 |
| 2019/0356481 | A1* | 11/2019 | Spector | G06Q 20/3674 |
| 2020/0005293 | A1* | 1/2020 | Opeola | G06Q 20/065 |
| 2020/0151698 | A1* | 5/2020 | Priebatsch | G06Q 20/385 |
| 2020/0258152 | A1* | 8/2020 | Naggar | G06Q 40/04 |
| 2020/0366480 | A1* | 11/2020 | Noonan | H04L 9/0861 |
| 2020/0402031 | A1* | 12/2020 | Pira | G06Q 20/389 |
| 2021/0304197 | A1* | 9/2021 | Pomassl | G06Q 20/3676 |

OTHER PUBLICATIONS

Blockgeeks, "Paper Wallet Guide: How to Protect Your Cryptocurrency". Retrieved on Mar. 13, 2019 from the Internet URL: <https://blockgeeks.com/guides/paper-wallet-guide/#Do_you_need_a_paper_wallet>, 27 pgs.

Orcutt, M., "Once hailed as unhackable, blockchains are now getting hacked". Retrieved on May 16, 2019 from the Internet URL: <https://www.technologyreview.com/s/612974/once-hailed-as-unhackable-blockchains-are-now-getting-hacked/>, Feb. 19, 2019, 8 pgs.

Mell, Peter, et al., "The NIST Definition of Cloud Computing", NIST Special Publication 800-145, Sep. 2011, Gaithersburg, MD, 7 pgs.

* cited by examiner

DIGITAL CURRENCY TRANSFER

BACKGROUND

Cryptocurrencies are forms of digital currency that can be exchanged between users in a manner similar to traditional currency except that cryptocurrency is maintained in digital form. Cryptocurrency use has become increasingly legitimized as major institutions and other entities adopt it as an acceptable form of payment. Cryptocurrency transactions are secured using cryptographic operations and coordinated via decentralized control in the form of a distributed ledger shared among nodes of a distributed network. Typically, though not always, that ledger is implemented as a blockchain. Example cryptocurrencies are bitcoin, litecoin, ripple, etherium, and zcash. The "coin" is the typical unit of currency.

When a sending party sends an amount of digital currency to a receiving party, the transaction is logged and validated by the distributed network. This takes time—a "waiting period" that can be 40 or more minutes in some instances. The practicality of cryptocurrency usage is often limited by this relatively slow speed at which the distributed network sometimes validates the transactions. Current approaches do not adequately address or overcome this delay. A major event during this window of time, such as a crash or rally in the value of the cryptocurrency, can cause significant problems. Issues of double-spend, lost currency, and inadequate security are among some of the drawbacks that users face with current cryptocurrency networks.

SUMMARY

Shortcomings of the prior art are overcome and additional advantages are provided through the provision of a computer-implemented method. The method receives, from a device executing an application with which a sender of digital currency has authenticated as part of a digital currency transfer to a recipient, the sender and the recipient being registered on a network for digital currency exchange and the sender having a sender account and recipient having a recipient account, an indication of a specified type and amount of the digital currency to be transferred to the recipient as part of the digital currency transfer and a specified public key of the recipient. The public key of the recipient uniquely identifies a digital permanent wallet of the recipient account. The method verifies that a digital permanent wallet of the sender account holds the specified type and amount of the digital currency to be transferred. The method creates and stores a digital temporary wallet to temporarily hold the digital currency to be transferred. The creating includes creating, for the digital currency transfer, a transaction key that uniquely identifies the digital currency transfer, and associates, with the created digital temporary wallet, the transaction key, the public key of the recipient, and indicators of the specified type and amount of the digital currency. The method transfers the digital currency of the specified type and amount from the digital permanent wallet of the sender to the digital temporary wallet. The method also sends, to the device, temporary wallet information of the digital temporary wallet. The sent temporary wallet information includes at least the transaction key for embodiment in a physical wallet to hold the digital currency being transferred, and the physical wallet to be printed and transferred to the recipient. The computer-implemented method for digital currency transfer has an advantage in that the fast and secure transfer of digital currency from one user to another is provided outside of the network of the digital currency and avoiding the delay of validating such a transaction via a blockchain or otherwise if performed within such network.

Further, a computer system is provided that includes a memory and a processor in communication with the memory. The computer system is configured to perform a method. The method receives, from a device executing an application with which a sender of digital currency has authenticated as part of a digital currency transfer to a recipient, the sender and the recipient being registered on a network for digital currency exchange and the sender having a sender account and recipient having a recipient account, an indication of a specified type and amount of the digital currency to be transferred to the recipient as part of the digital currency transfer and a specified public key of the recipient. The public key of the recipient uniquely identifies a digital permanent wallet of the recipient account. The method verifies that a digital permanent wallet of the sender account holds the specified type and amount of the digital currency to be transferred. The method creates and stores a digital temporary wallet to temporarily hold the digital currency to be transferred. The creating includes creating, for the digital currency transfer, a transaction key that uniquely identifies the digital currency transfer, and associates, with the created digital temporary wallet, the transaction key, the public key of the recipient, and indicators of the specified type and amount of the digital currency. The method transfers the digital currency of the specified type and amount from the digital permanent wallet of the sender to the digital temporary wallet. The method also sends, to the device, temporary wallet information of the digital temporary wallet. The sent temporary wallet information includes at least the transaction key for embodiment in a physical wallet to hold the digital currency being transferred, the physical wallet to be printed and transferred to the recipient. The computer system has an advantage in that the fast and secure transfer of digital currency from one user to another is provided outside of the network of the digital currency and avoiding the delay of validating such a transaction via a blockchain or otherwise if performed within such network.

Yet further, a computer program product including a computer readable storage medium readable by a processing circuit and storing instructions for execution by the processing circuit is provided for performing a method. The method receives, from a device executing an application with which a sender of digital currency has authenticated as part of a digital currency transfer to a recipient, the sender and the recipient being registered on a network for digital currency exchange and the sender having a sender account and recipient having a recipient account, an indication of a specified type and amount of the digital currency to be transferred to the recipient as part of the digital currency transfer and a specified public key of the recipient. The public key of the recipient uniquely identifies a digital permanent wallet of the recipient account. The method verifies that a digital permanent wallet of the sender account holds the specified type and amount of the digital currency to be transferred. The method creates and stores a digital temporary wallet to temporarily hold the digital currency to be transferred. The creating includes creating, for the digital currency transfer, a transaction key that uniquely identifies the digital currency transfer, and associates, with the created digital temporary wallet, the transaction key, the public key of the recipient, and indicators of the specified type and amount of the digital currency. The method transfers the digital currency of the specified type and amount from the digital permanent wallet of the sender to the digital temporary wallet. The method also sends, to the device, temporary wallet information of the digital temporary wallet. The sent temporary wallet information includes at least the transaction key for embodiment in a physical wallet to hold the digital currency being transferred, the physical wallet to be printed and transferred to the recipient. The computer program product has an advantage in that the fast and secure transfer of digital currency from one user to another is provided outside of the network of the digital currency and avoiding the delay of validating such a transaction via a blockchain or otherwise if performed within such network.

Additional features and advantages are realized through the concepts described herein.

For instance, associating the transaction key with the created digital temporary wallet locks the transaction key to the public key of the recipient such that completion of the transfer of the digital currency is possible only to the digital permanent wallet of the recipient account uniquely identified by that public key. This has an advantage in that the currency is directed only to the account of the legitimate recipient; a nefarious actor, even with the CPW or transaction key, is unable to redirect the currency to a digital wallet other than that of the recipient.

The method can further include receiving a scanned transaction key from a client device as part of a request to complete the digital currency transfer, correlating the received scanned transaction key to the transaction key uniquely identifying the digital currency transfer, verifying that the recipient having the public key associated with the created digital temporary wallet has authenticated with an application of the client device from which the scanned transaction key was received, and based on the verifying, transferring the digital currency of the specified type and amount to the digital permanent wallet of the recipient account uniquely identified by the public key. This has an advantage in that it can quickly and securely complete an initiated digital currency transfer when requested by the true recipient of the digital currency and only based on that user being properly authenticated with the device attempting to complete the transfer.

The verifying that the recipient has authenticated can include verifying that the public key associated with the created digital temporary wallet matches to a public key of a user logged into the network via the application. These aspects have an advantage in that they assure that the transfer to the recipient's account does not occur in the event a different user scans the temporary key.

The method can further include receiving, from the sender after authenticating to the network, an indication that the digital currency transfer is to be voided, determining whether the digital currency transfer has already completed such that transfer of the digital currency to the digital permanent wallet of the recipient has already occurred, and based on receiving the indication and on determining that the digital currency transfer has not already completed, cancelling the digital currency transfer, the cancelling rendering presentation of the transaction key ineffective to initiate completion of the digital currency transfer. This has an advantage in that it provides flexibility to void a transfer in case the initial transfer attempt becomes compromised or the transaction key is lost by the recipient.

The indication can indicate that the digital currency transfer is to be reinstantiated using a new transaction key. The method can further include establishing a new digital currency transfer to transfer the specified type and amount of digital currency from the sender to the recipient. This has an advantage in that it provides flexibility to reinstantiate a transfer in case the digital currency is still due to be paid to the recipient, despite the initial transfer attempt being compromised or the transaction key lost.

Establishing the new digital currency transfer can include, as an example, creating a new digital temporary wallet having associated therewith a new transaction key, transferring the digital currency to the new digital temporary wallet and invalidating the transaction key to render presentation of the transaction key associated therewith ineffective to initiate completion of the digital currency transfer, and sending to the device temporary wallet information of the new digital temporary wallet, including the new transaction key. This approach for establishing the new digital currency transfer has an advantage in that security is heightened because all new constructs may be used.

The network for digital currency exchange can register users for digital currency exchange, where each user has a respective account that includes a digital permanent wallet holding one more digital currencies, and where each such account is associated with a respective unique public key identifying the digital permanent wallet of the account. This has an advantage in that currencies of various types can be easily and quickly moved between the user's digital permanent wallet and digital temporary wallet(s) for digital currency transfer in accordance with aspects described herein.

The method can further include storing to a ledger of the network a record of the digital currency transfer, the record including the transaction key, the public key, and a transaction time of the transaction, and indicating the specified type and amount of digital currency. This has an advantage in that it provides for traceability and verifiability of transfers, and enables voiding/canceling of such transfers if not yet completed.

The method can further include replicating the ledger to remote computer systems, wherein each of the remote computer systems is available to a client device to validate the digital currency transfer using the ledger replicated to the remote computer system. This has an advantage in that different systems with the authentic ledger could be available for transfer validation in order to transfers to complete.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
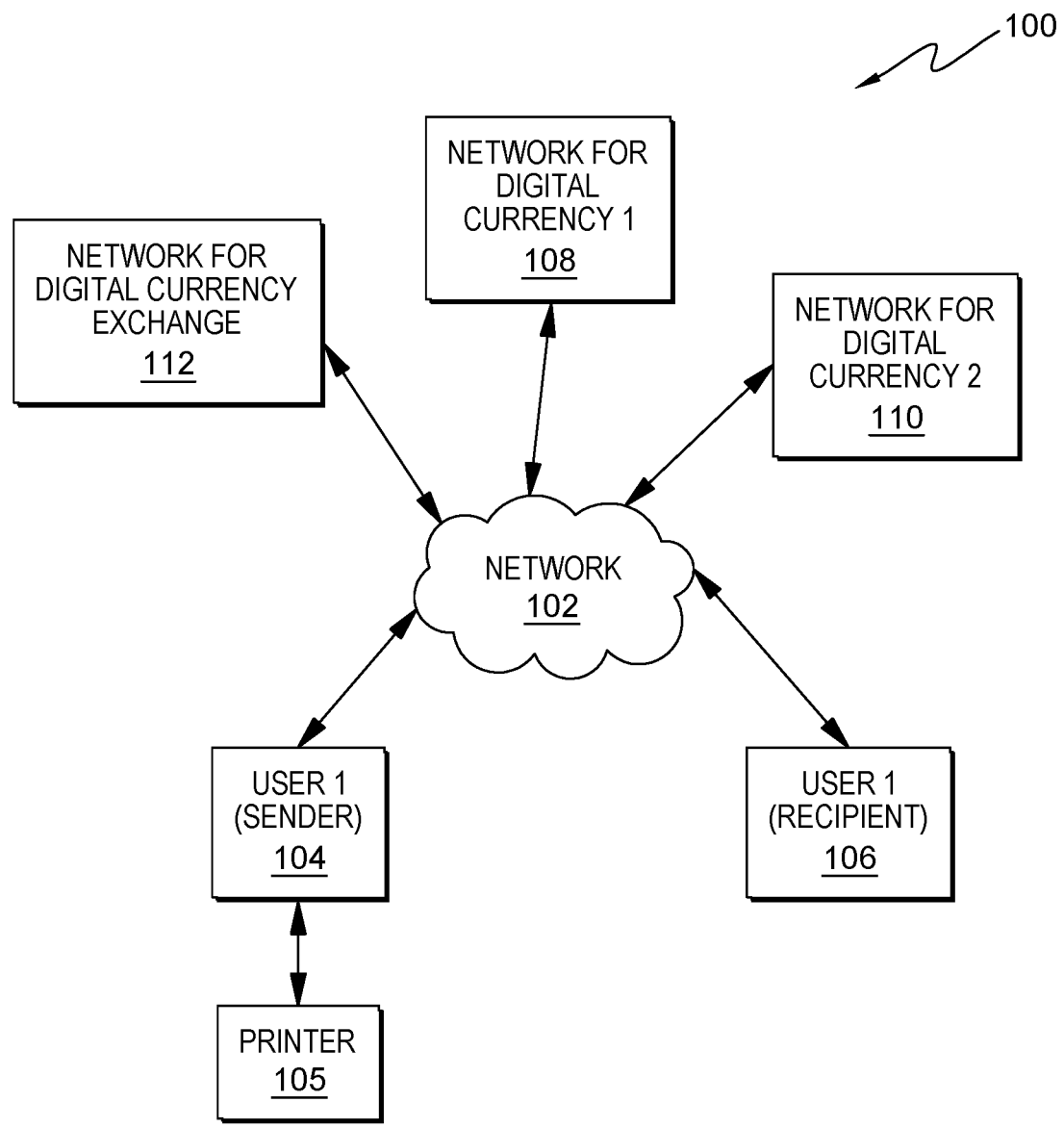
FIG. 1 depicts an example environment to incorporate and use aspects described herein.

Described herein are approaches to address problems of validation delay and others by providing a temporary wallet that holds digital currency to be transferred, and from which the digital currency is embodied in physical form for physical transfer to the recipient. A bearer can print a physical embodiment (referred to herein as a compact physical wallet, or CPW) of the digital currency being transferred from the temporary wallet, and do so in a secure manner. The printed CPW can be handed to a new bearer. Through physical change of ownership that can take place near-instantly, the issue of changing price of a cryptocurrency between the time a transaction is initiated and the time it is 'completed' may be avoided. By way of example, assume a temporary wallet is created and holds 1 unit of a given digital currency. The CPW is printed pursuant to an arrangement involving a sender/conveyor of the digital currency and a recipient of that currency to transfer the digital currency to a physical form. At the time of the transaction or conveyance, the CPW is passed to the recipient who can move the digital currency into the user's 'permanent' wallet for retaining or cashing-out.

In accordance with aspects described herein, a server or other computer system creates and stores a digital temporary wallet to temporarily hold the digital currency to be transferred. This also creates a transaction key for the digital currency transfer. The transaction key, also referred to herein as a private key, uniquely identifies the digital currency transfer. Recipients have published public identifiers/keys. The system associates, with the created digital temporary wallet, various pieces of information, which can include the transaction key, a public key/identifier of the recipient of the digital currency that is the subject of the digital currency transfer, and indicators of the specified type and amount of the digital currency, along with any other desired information. The transaction key for a given transfer is locked to the public key of the recipient's digital wallet, meaning that for redemption purposes, the currency initially transferred to the temporary wallet and then printed in physical form can be transferred only to a wallet of the recipient's account (the "digital permanent wallet" of the recipient). The sender of the digital currency can print the transaction key as a CPW that embodies the currency being transferred, for physical transfer to the recipient. The recipient can scan/redeem the CPW to complete the transfer. By locking the transaction key to a specific public key of the true recipient, this creates a secure mode of transferring cryptocurrency. The CPW is easy to use and enables transfer only from the original bearer of the currency to the intended recipient.

In some embodiments, printing the transaction key can be restricted. For instance, it may be printed only once, and only with the public key of the recipient, in an example. The digital temporary wallet that holds the specified type and amount of the digital currency may no longer hold the currency from the point in time when the CPW is printed, for instance because the CPW is the 'next state' of the digital currency until redeemed to effect a transfer of the digital currency into the wallet of the recipient.

It is noted that since the transaction key is locked to and associated with the public key of the particular, true recipient of the digital currency, theft of the digital currency by photocopying the CPW, for instance, is not possible. Associating the transaction key with the created digital temporary wallet (from which the CPW is created) locks the transaction key to the public key of the recipient identified as the true recipient for the currency initially transferred to that digital temporary wallet. Completion of the transfer of the digital currency is possible only to the digital permanent wallet of the recipient account that is uniquely identified by that public key. And once transfer is completed, it cannot be completed again; multiple copies of the CPW will not multiply the amount of currency transferred.

A network for digital currency exchange as described herein can include multiple computer systems in communication with each other. The network records transactions and store records of digital currency transfer. Client devices (smartphones, wearables, other computer systems) can have installed thereon software, e.g. an app, that is network aware and that facilitates currency transactions and records print events that print CPWs. The app can be password locked or secured in any desired fashion. It may be made unlockable using any desired technique. Biometrics, such as fingerprint or iris scan locking, is one example. Such an enhanced technique for unlocking the app can provide an additional layer of security through association. In addition, the printer can also be independently and biometrically locked/unlocked for CPW printing, as an added layer of security, if desired.

The transaction information, including print of the CPW for a transaction, can be written to a ledger, which may be a distributed ledger. Distributing records of the digital temporary wallet and transaction key locked to the specific public key of the recipient can help ensure authenticity. Additionally, this can enable tracing a transaction in case of a lost CPW. A computer system (referred to herein as the 'master' system) of the network for digital currency exchange can create and store a digital temporary wallet to temporarily hold the digital currency to be transferred. It can also create the unique transaction key that uniquely identifies the digital currency transfer, and associate the transaction key, public key, and other indicators of the transfer, for instance the type and amount of digital currency, with/to the digital temporary wallet. The system can also send information identifying or describing the digital temporary wallet, e.g. temporary wallet information, including the transaction key, to the app installed on the sender's device, in order for the sender to print the transaction key, embodying it in the physical wallet form.

The approach can be speed insensitive. By printing a CPW, the bearer can immediately pass on this token of the currency, which can be 'cashed out' of the system by the receiver at a later point in time without having to wait for the on-line transaction to complete (i.e. subject to validation delay). Aspects can therefore help overcome the potentially crippling challenge to manage the cryptocurrency value between the time a transaction is initiated and time it is completed/validated, which can currently take 40 mins or longer. The CPW allows for instantaneous completion of the transaction by physically transferring the ownership of the physical wallet from the sender to the receiver, as the receiver could immediately scan/redeem the CPW after taking physical control, as described elsewhere herein.

As an enhancement, the CPW can provide a double layer of security for a user. The user can associate the user's own public key with a temporary wallet to temporarily hold a desired amount of digital currency transferred from the user's own digital permanent wallet, and then print a CPW for the currency. In the event of a compromise to the user's digital permanent wallet, the currency of the "printed coin", i.e. CPW, is unaffected because it has been transferred and held as the CPW. The CPW can be redeemed after the compromise is resolved, to transfer the currency back to an account (the existing, or a new one) having the user's public key associated therewith.

Additionally or alternatively, in some embodiments, the CPW can be used to store cryptocurrencies in a non-digital format. A user can hold two accounts in the network 112 or use a single account to perform the role of both the sender and the receiver in a digital currency transaction. Here, the 'sender' transfers a certain amount of cryptocurrency to its own account (as recipient), prints the CPW and stores it in a physical location. Later, the sender redeems the CPW in the network 112 at any point in the future.

FIG. 1 depicts an example environment to incorporate and use aspects described herein. Environment 100 includes a central network 102, such as the internet, interconnecting other devices for communication. Here, a simplified example is presented with user 1 (sender) and user 2 (recipient) who interact with the environment via respective devices 104 and 106, e.g. smartphones, tablets, and/or other types of computer systems. Sender device 104 is in communication with a hardware printer 105 for printing CPWs. Also available across network 102 are two (in this example) networks for digital currency, i.e. network for digital currency 1 (108) and network for digital currency 2 (110). A network for digital currency refers to the network of nodes supporting a given digital currency—recording transactions, writing to the ledger, mining additional coins, and the like.

In addition to the networks for digital currency 108, 110, network for digital currency exchange 112 refers to system(s) for performing aspects described herein to effectuate digital currency transfers as described. The network 112 could include one or more controllers that perform, among other tasks, digital temporary wallet creation and management, user account management, and other functions, as well as transaction recording.

Although the networks 108, 110 and 112 are componentized in a single box in FIG. 1, it should be understood that these networks might typically be distributed and interconnected via a wide area network, e.g. network 102.

Interconnections (double arrows) between components represent communications links across which the devices communicate. The communication links can be wired and/or wireless communications link(s), such as Ethernet-based wired or wireless connections. Example wireless connections include cellular, Wi-Fi, Bluetooth®, proximity-based, near-field, or other types of wireless connections. More generally, the communications links may be any appropriate wireless and/or wired communication link(s) for communicating data.

Both the sender (user 1) and the receiver (user 2) of cryptocurrency are registered to the network 112 with an account and have an app installed on devices 104, 106. Users of network 112 each have a unique public key that may be published and that uniquely identifies a digital permanent wallet of that user. The digital permanent wallet is part of an account that is maintained for the user. The permanent wallet can hold one or more digital currencies, for instance a particular number of Bitcoin transferred to the permanent wallet by the user, and a particular number of Litecoin transferred to the permanent wallet by the user, as examples. The permanent wallets are permanent in the sense that they are not temporary wallets created according to aspects described herein for purposes of digital currency transfer. The user can transfer digital currency from network 108, 110 into the user's permanent wallet of network 112 so that it is available for transfer within network 112 to another user of network 112 and in accordance with aspects described herein. In this regard, if user 1 desires to transfer 0.5 bitcoin (BTC) to user 2 in network 112, user 1 would have at least that amount of BTC in the user's permanent wallet. This may have been transferred in from, e.g., network 108 via the existing BTC transaction approach through the BTC blockchain.

The sender (user 1) represented by device 104 and interacting with network 112 via the app installed on the device 104 indicates a specified type and amount of the digital currency to be transferred to the recipient (user 2) as part of a digital currency transfer within network 112. A master controller/server of network 112 creates a temporary digital wallet into which the digital currency of the specified type and amount is transferred from the digital permanent wallet of the sender (assuming the permanent wallet of the sender is verified to hold that currency). The digital temporary wallet is a temporary construct in that it can be deleted after it serves its purpose of temporarily holding the currency for transfer, for instance when the CPW is printed. A new, unique transaction key is generated for each digital temporary wallet. In this manner, each transaction key is specific to a single digital temporary wallet and currency transfer/transaction.

In some embodiments, and as mentioned, there is a single, master server/central repository entity that controls the digital wallet constructs and maintains the information regarding digital currency transfers. The master can be the system that interfaces with the underlying cryptocurrency networks (e.g. 108, 110). The user can transfer digital currency from a respective cryptocurrency network into the network 112 such that the master receives the transferred currency into the permanent wallet established for that user. Meanwhile, the master may also be master of the ledger of the digital currency transfers within network 112. For each digital currency transfer, the ledger can store data indicating the public/transaction key combination involved, the amount and type of digital currency, date/time information of the transaction, and any other desired information. Example date/time information can be or include transaction date(s)/time(s), such as when the transfer was initiated by the sender, when the master created the transaction key and/or temporary wallet, and/or when the recipient redeems the CPW to complete the transfer, as examples. The ledger could be distributed to other nodes of network 112. The ledger could be replicated and stored in different locations at given points in time as a form of back-up. This could be used to provide multiple sources of 'truth' for use in validating a transaction, for instance in case the main server is unavailable or compromised. In some embodiments, the main server controls and performs the creation of new information, such as by generating new keys, temporary wallets, accounts, and enrolling users, so that this new data originates from a single authoritative entity. That data can be distributed to other locations for backup or integrity purposes, if desired.

The CPW for a given digital currency transfer may be printed to a connected printer (e.g. 105) by the sender's device (e.g. 104). As described herein, the sending user can interact with a client application and enter a type and amount of the digital currency which is to be transferred and which is for representation in physical form as a printed CPW. Additionally, the sender can identify the recipient of the digital currency, for instance by scanning or entering into the app the public key of the receiver after being prompted by the app. As one example, a barcode or other indicia of the public key, perhaps presented by the recipient or his/her device, can be scanned into the app. As another example, the sending user or sender's device could look up the recipient's public key in a directory, address book, or other repository.

Software executing on the master server creates a digital temporary wallet. The digital temporary wallet is any desired type of digital construct/data structure(s). The software on the master transfers the specified amount of the type of currency from the permanent wallet of the sender to the digital temporary wallet. The digital temporary wallet can have associated with it various temporary wallet information, examples of which include, but are not limited to, a creation time of the temporary wallet, the public key of the recipient and the transaction key locked to it, the amount and type of digital currency, and an identifier of the sender's permanent wallet/account. As noted, the transaction key is unique to each transfer/digital temporary wallet and it is locked to the public key to receive the transfer of currency. The ledger entry with the relevant information describing the digital currency transfer by way of the temporary wallet and a CPW to which the currency is transferred from the temporary wallets can remain in the ledger for any desired amount of time. In general, it may remain for a relatively long time or forever, as this may be important for purposes of traceability in case the CPW is lost and other reasons.

Some or all of the temporary wallet information is passed down to the sender device and the client app executing thereon, and this is used to build a digital version of the CPW for printing to the printer as the physical CPW. The client app on the sender device receives at least some of the temporary wallet information from the master server. The sender app then sends some or all of the received temporary wallet information to be printed, for instance the transaction key of the digital temporary wallet, the public key of the recipient, the amount of currency, and/or the type of currency. In some embodiments, at least the transaction key is printed on the CPW. The CPW can be made any size, though in embodiments may be small, for instance 7 cm×15 cm, or smaller. The printer can be an ultra-compact handheld wireless printer that communicates with the sender device across a Bluetooth, near-field, or Wi-Fi connection, as examples. The printer may be configured for polarized printing with ultra-low ink consumption.

The sender physically transfers the CPW to the recipient. The recipient is then the bearer of the printed wallet (CPW) representing the digital currency, and can keep the currency represented in that physical state for as long as desired. To transfer the digital currency to the recipient's permanent digital wallet, the recipient requests to complete the digital currency transfer, thereby effecting a transfer of the currency into the recipient's digital permanent wallet. This can be initiated by the recipient via the app on the recipient device 106, for instance entering the transaction key printed on the CPW or scanning the key printed on the CPW leveraging an imaging device such as a camera or barcode scanner. The transaction key can be represented in any desired form, for instance as a barcode (e.g. a QR code) or text. The recipient's app acquires the relevant information (e.g. the transaction key) presented by the CPW and conveys that to the master server or another authoritative node on network 112 that can validate a transaction. If this request is received from the recipient and authenticated, the digital currency can be transferred to the digital permanent wallet associated with the public key, i.e. of the recipient. This process is referred to as redeeming the CPW to the recipient's permanent wallet.

In case a CPW is lost by the recipient, the recipient can alert or request that the sender re-issue a new CPW and cancel the previous CPW. As one example, the sender makes a request via the sender's app. An access is made to the ledger that records the digital currency transactions, including the transaction embodied by the now-lost CPW. For example, the sender enters the app on the sender device and searches through transfers in which the sender is involved. Upon finding the subject transfer for which the CPW was lost, the sender could select an option to cancel the digital currency transfer and reinstantiate it to reissue a new CPW. In the event the CPW has already been redeemed and the transfer already completed, then such cancellation may not be an option for the sender.

The sender can cancel the transaction through the sender's app, establish a new digital currency transfer, and print a new CPW. Cancellation in this context can refer to rendering the presentation of the (lost) CPW, particularly the transaction key thereon, ineffective to initiate the completion of the digital currency transfer, i.e. to cause transfer of the digital currency to the recipient's permanent wallet. One example of establishing the new digital currency transfer is to create a new digital temporary wallet having associated therewith a new transaction key. The server then transfers the digital currency to the new digital temporary wallet and invalidates the original transaction key to render presentation of the original transaction key ineffective to initiate completion of the digital currency transfer. Then the server sends to the sender device the temporary wallet information of the new digital temporary wallet, which includes the new transaction key. These aspects provide for nullifying a CPW in case it is lost or stolen.

The physical transfer of the CPW may not be an insignificant act. Until the CPW is passed to the recipient, the digital currency remains to some extent in the custody and control of the sender, and the recipient does not have a way of getting the digital currency. Even if a digital temporary wallet is constructed and recorded as a payment to the recipient, the sender could refrain indefinitely from printing that CPW, and/or, if the CPW was printed, refrain from passing it to the recipient, rendering the recipient unable to obtain that currency. The sender could be permitted to void the digital currency transfer, if desired. In the meantime, if the sender loses the CPW prior to passing to the recipient, the only consequence of losing the CPW is if it is found and 'redeemed' by the true recipient. In this regard, a redemption attempt to complete the transaction may only be allowed from an application with which the true recipient has authenticated. If an app/account not proven to belong to the recipient scans the CPW and requests completion, the transfer may not be validated. In this event, an alert could be sent to the sender and/or recipient. Meanwhile, the sender would be permitted to cancel the CPW and reissue a new one with a new transaction key, if desired.

Figure 2:
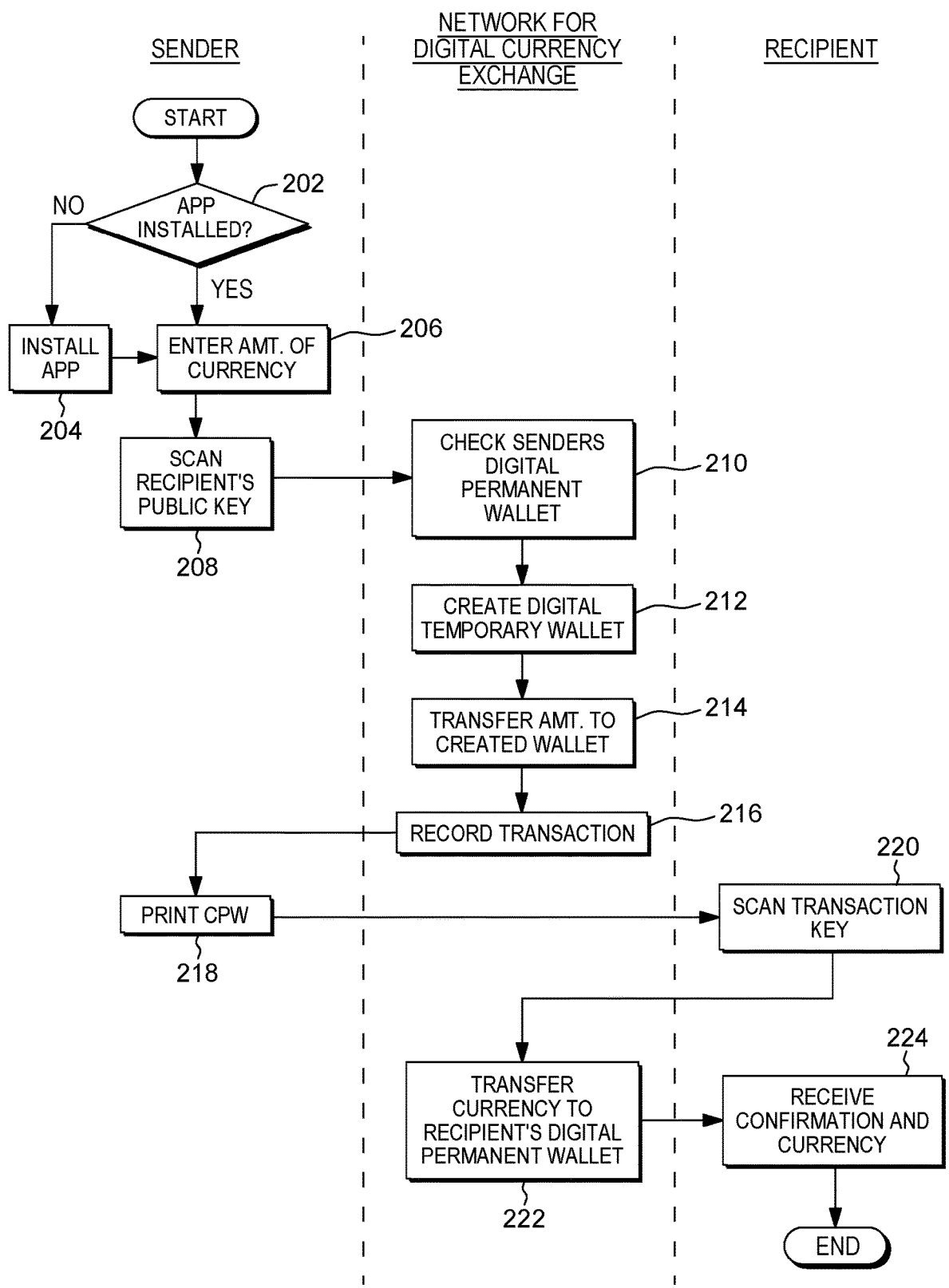
FIG. 2 depicts example interactions between a sender of digital currency, recipient of the digital currency, and network for digital currency exchange, in accordance with aspects described herein.

To illustrate these and other aspects, refer to FIG. 2, which depicts example interactions between a sender of digital currency, recipient of the digital currency, and network for digital currency exchange, in accordance with aspects described herein. Actions are presented as being performed by the sender, network for digital currency exchange, and recipient, though it should be understood that the actions refer to actions performed by device(s) acting on behalf or at the request/control of the sender, recipient, and network.

The process is initiated when a sender attempts to initiate a new digital currency transfer. The process begins with an inquiry (202) of whether the client-side application supporting digital currency transfer as described herein is installed. If not (202, N), the process installs (204), with user guidance, the application on the sender's device. Then, or if at 202 it was determined that the app is installed, the process proceeds with the sender entering (206) an amount and type of currency to be transferred. The process then scans (208) the recipient's public key. In an example, the sender scans a barcode or other representation of the recipient's public key. As an alternative, the process obtains the public key by any other appropriate means, for instance by the sender entering alphanumerics of the key, searching and selecting the key or recipient from a directory or database, or the like.

At that point, relevant information that includes the currency type and amount and the recipient's public key, or identifier thereof, is communicated to the network for digital currency exchange. Computer system(s) of this network, for instance the master server, perform actions of the network, for instance checking (210) the sender's digital permanent wallet to verify that the digital permanent wallet of the sender account holds the specified type and amount of that digital currency to be transferred to the recipient. Assuming the sender has the sufficient funds, the master creates (212) the digital temporary wallet and transfers (214) the requested amount of the indicated digital currency to the created digital temporary wallet. The master records (216) this transaction to the ledger and sends a response to the sender's app confirming that the transfer was initiated and providing relevant information to the sender app, for instance temporary wallet information having the transaction key for printing as part of a CPW. The sender prints (218) the CPW.

The printed CPW is transferred to the recipient at some point. Thereafter, the recipient, by way of an app executing on the recipient's device, scans (220) the transaction key printed on the CPW, for instance in the form of a QR code. Information extracted by way of that scan is communicated to the network (e.g. master server or another node with validation capability to validate the transaction and that the redemption attempt is legitimate, i.e. by the recipient). Based on validating the redemption attempt, the process transfers (222) the currency to the recipient's digital permanent wallet. For instance, the value of that currency is disassociated with the CPW and associated with the permanent wallet of the recipient, such that the recipient could 'cash out' that currency from the network (112) to the corresponding digital currency network (e.g. 108, 110) at that point. Assuming the transfer (222) is successful, the process proceeds with the sender receiving (224) a confirmation of the completion of the transfer, and, more importantly, receiving the currency itself as it has now been transferred into the permanent wallet of the recipient and therefore the full custody and control of the recipient.

Figure 3:
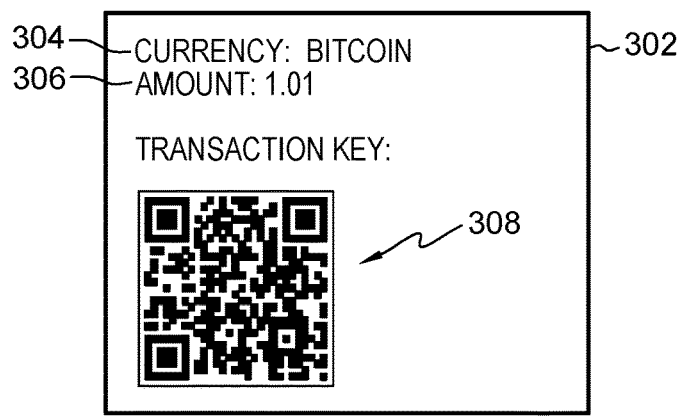
FIG. 3 depicts an example physical wallet having a transaction key, in accordance with aspects described herein.

FIG. 3 depicts an example physical wallet having a transaction key, in accordance with aspects described herein. CPW 302 includes an indication 304 of the type of currency (Bitcoin) and indication 306 of the amount of currency (1.01 BTC). It also displays the transaction key as QR code 308, meaning the transaction key is encoded as a QR code for quick scanning using an imaging device, for instance a camera of the recipient's mobile device.

Accordingly, described herein are aspects that can facilitate digital currency transfer, and in particular provide an ability to transfer the ownership of a cryptocurrency from one person to another at a rate that is potentially much faster than transferring the currency from one wallet to another via the currency's network and blockchain.

Meanwhile, financial instruments in the global and national markets enable investors to make investment decisions based on price changes and price stability of various commodities, stocks, bonds, etc. For instance, short selling and long straddle are various strategies used to manage risk. The strategies are based on the investor's forecast of market trends in the future. Currently, there is no active trading of cryptocurrencies in the stock market except for mutual funds, exchange-traded notes (ETNs) and exchange-traded funds (ETFs). An expectation is that, in the years to come, trading in futures and options with the underlying asset will become available, at which point it may be desired to utilize the difference in prices, or the lack of such difference, in less time. The facilities presented herein allow investors to make investment decisions based on the expected price differences by near-instantaneously transferring ownership of digital currency, enabling realization of gains and/or minimization of losses. Aspects described herein might enable utilization of dynamic price differences and price stability of the underlying cryptocurrency and the "option of the cryptocurrency" that might exist in the future.

Additionally, by buying and selling the cryptocurrency using regular currencies such as the U.S. Dollar, one could make investment decisions based on differences in buying and selling rates. Furthermore, if the price of a specific cryptocurrency is known to be different at different cryptocurrency exchanges at a given point in time, one could leverage aspects described herein for gain by transferring cryptocurrency into the network 112 and then cashing it out with a regular currency.

FIGS. 4-8 present example processes that may be performed by one or more computer systems to realize aspects described herein. The processes may be performed in whole or in part by one or more sender devices, one or more recipient devices, and/or one or more systems of a network for digital currency exchange, as described herein.

Figure 4:
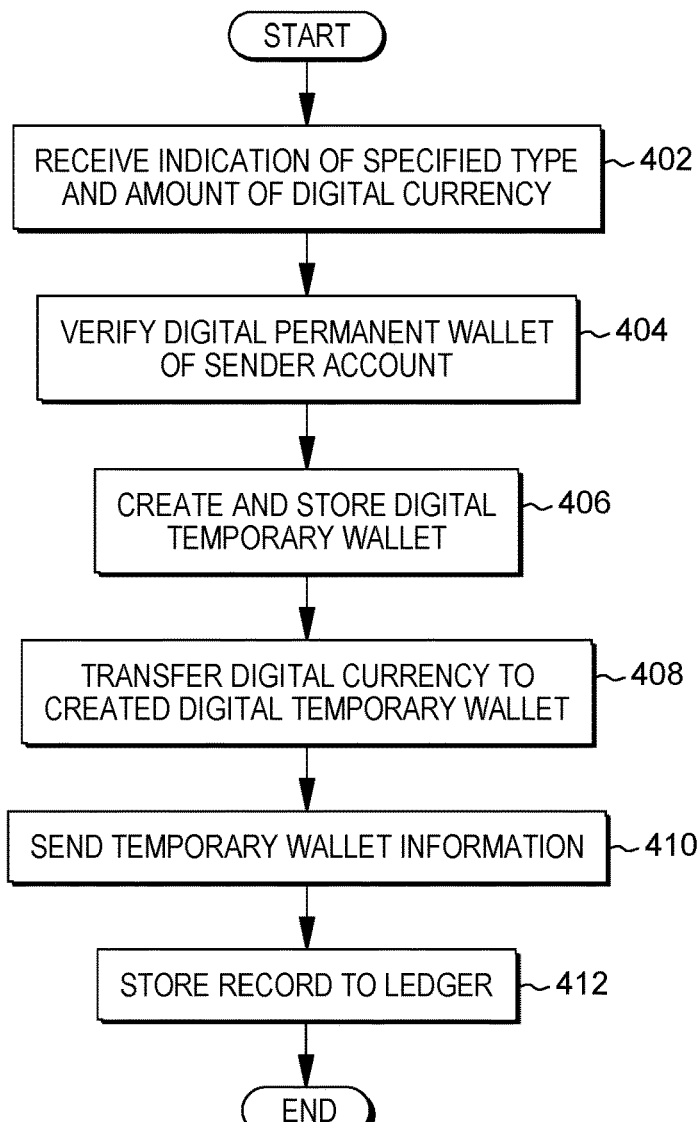
FIG. 4 depicts an example setup process for a digital currency transfer, in accordance with aspects described herein.

FIG. 4 depicts an example setup process for a digital currency transfer, in accordance with aspects described herein. In some examples, aspects of the process are performed by a main/master server of a network for digital currency exchange (e.g. 112) as described herein. The process receives (402) an indication of a specified type and amount of the digital currency to be transferred to a recipient as part of a digital currency transfer. A sender of the digital currency can be logged into and authenticated with an app that is executing on a sender device. The indication can be received from this device, executing the application with which the sender of digital currency has authenticated, as part of a digital currency transfer to the recipient. The sender and the recipient can be registered on the network for digital currency exchange, with the sender having a sender account and recipient having a recipient account. As part of this, a specified public key of the recipient can also be received in conjunction with the indication of the type and amount of digital currency. The public key of the recipient can uniquely identify a digital permanent wallet of the recipient account. Any other desired information about the transfer could be received from the sender app as well.

In some examples, the network for digital currency exchange registers users for digital currency exchange, where each user has a respective account that includes a digital permanent wallet holding one more digital currencies. Each such account can be associated with a respective unique public key that identifies identifying the digital permanent wallet of the account. This has an advantage in that currencies of various types can be easily and quickly moved between the user's digital permanent wallet and digital temporary wallet(s) for digital currency transfer in accordance with aspects described herein.

The process of FIG. 4 continues by verifying (404) that a digital permanent wallet of the sender account holds the specified type and amount of the digital currency to be transferred. This verifies that the sender has available in the sender's digital permanent wallet the digital currency that the sender is attempting to transfer to the recipient. Assuming verification is successful, the process creates and stores (406) a digital temporary wallet to temporarily hold the digital currency to be transferred. Creating the digital temporary wallet includes creating, for the digital currency transfer, a transaction key that uniquely identifies the digital currency transfer, and associating, with the created digital temporary wallet, the transaction key, the public key of the recipient, and indicator(s) of the specified type and amount of the digital currency. Associating the transaction key with the created digital temporary wallet locks the transaction key to the public key of the recipient such that completion of the transfer of the digital currency is possible only to the digital permanent wallet of the recipient account uniquely identified by that public key. This has an advantage in that the currency is directed only to the account of the legitimate recipient; a nefarious actor, even with the CPW or transaction key, is unable to redirect the currency to a digital wallet other than that of the recipient.

The process then transfers (408) the digital currency of the specified type and amount from the digital permanent wallet of the sender to the digital temporary wallet, and sends (410) back to the sender device temporary wallet information of the digital temporary wallet. The sent temporary wallet information can include at least the transaction key, and more generally whatever information that the sender device is to have about the transfer. The transaction key (and any other desired information) may be for embodiment in a physical wallet (e.g. CPW) that is to hold the digital currency being transferred and that is to be printed and transferred to the recipient.

The process then stores (412) to a ledger of the network for digital currency exchange a record of the digital currency transfer. The includes at least the transaction key, the public key, and a transaction time of the transaction, and indicates the specified type and amount of digital currency. This has an advantage in that it provides for traceability and verifiability of transfers, and enables voiding/canceling of such transfers if not yet completed.

The process of FIG. 4 for digital currency transfer has an advantage in that the fast and secure transfer of digital currency from one user to another is provided outside of the network of the digital currency and avoids the delay of validating such a transaction via a blockchain or otherwise if performed within such network.

In some aspects, the ledger can be replicated to remote computer systems (remote from, e.g. the main/master server), where each of the remote computer systems is available to client device(s) for transfer validation. This has an advantage in that different systems with the authentic ledger could be available for transfer validation in order to transfers to complete. For instance, a remote system with the ledger may be one with which the recipient's device communicates to validate the digital currency transfer using the ledger replicated to the remote computer system. It also provides backup of the ledger in case of corruption, loss, and the like at the main server.

Figure 5:
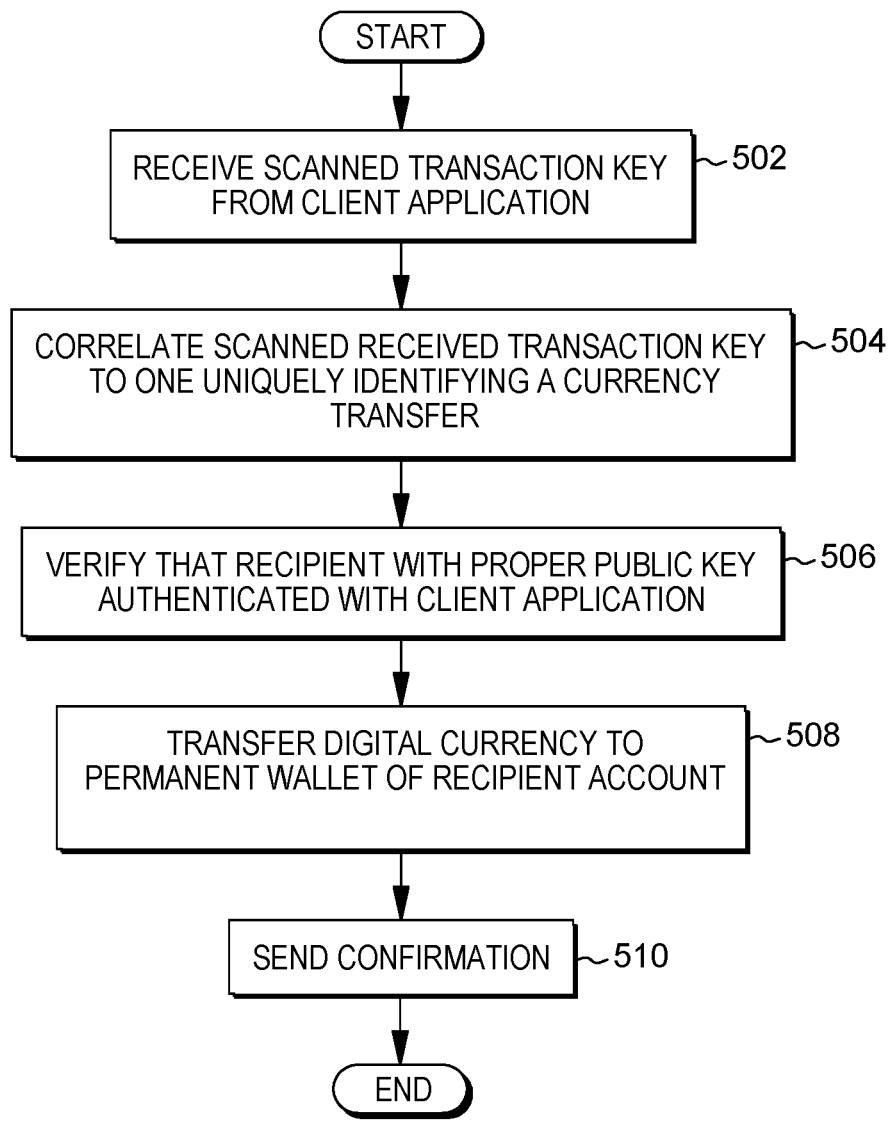
FIG. 5 depicts an example process for redeeming a digital currency transfer, in accordance with aspects described herein.

FIG. 5 depicts an example process for redeeming a digital currency transfer, in accordance with aspects described herein. In some examples, aspects of the process are performed by a main/master server of a network for digital currency exchange (e.g. 112) as described herein. When a recipient wants to complete the digital currency transfer and redeem the temporary wallet such that the currency therein is to be moved to the recipient's digital permanent wallet, the server receives (502) a scanned transaction key from a client device (e.g. recipient device) as part of a request to complete the digital currency transfer. The process correlates (504) the received scanned transaction key to the transaction key that uniquely identifies the digital currency transfer. In other words, a lookup or search is performed to see whether the received scanned transaction key matches to one known to the network (112). Upon receipt of the scanned transaction key, the server performs a correlation and identifies that the received key correlates to some temporary key created preciously and associated with a transfer. The process then verifies (506) that the recipient having the public key associated with the prior-created digital temporary wallet when the transfer was initiated (and identified by the received transaction key) has authenticated with an application of the client device from which the scanned transaction key was received. Thus, once it is seen by way of receiving the temporary key which transaction is the subject of this redemption attempt, there is a determination/verification that the user/true recipient associated with the public key corresponding to the transaction key has actually authenticated with the app (or at least the device) that is attempting to redeem the CPW and complete the transfer. Verifying that the recipient has authenticated can include verifying that the public key associated with the created digital temporary wallet matches to a public key of a user logged into the network via the application. These aspects have an advantage in that they assure that the transfer to the recipient's account does not occur in the event a different user scans the temporary key. It may be desired by the recipient that the currency remain in CPW for the time being, for instance, and therefore if another user attempts to compete the transfer on behalf of the recipient, the attempt can fail.

Based on the verifying, the process transfers (508) the digital currency of the specified type and amount to the digital permanent wallet of the recipient account uniquely identified by the public key, and sends (510) a confirmation to the recipient. The process of FIG. 5 has an advantage in that it can quickly and securely complete an initiated digital currency transfer when requested by the true recipient of the digital currency and only based on that user being properly authenticated with the device attempting to complete the transfer.

Figure 6:
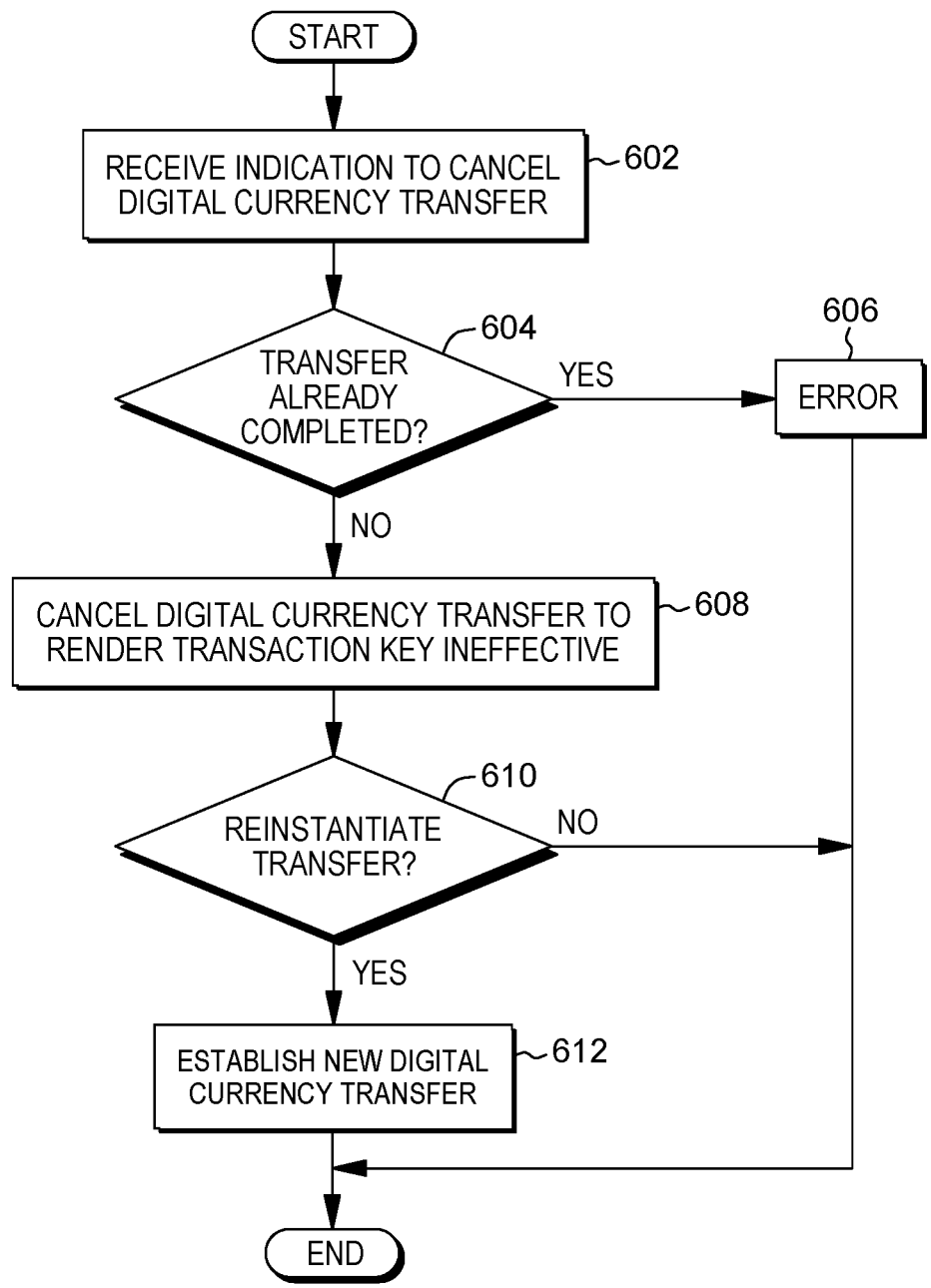
FIG. 6 depicts an example process for cancelling a digital currency transfer, in accordance with aspects described herein.

FIG. 6 depicts an example process for cancelling a digital currency transfer, in accordance with aspects described herein. In some examples, aspects of the process are performed by a main/master server of a network for digital currency exchange (e.g. 112) as described herein. The process receives (602), from the sender after authenticating to the network, an indication that the digital currency transfer is to be cancelled or voided. The sender could be using any of various different devices, and not necessarily the same device used to initiate the transfer. Voiding the transaction can therefore be based on whether the user (sender) has properly authenticated to the network to provide the indication to void the digital currency transfer.

The process determines (604) whether the digital currency transfer has already completed such that transfer of the digital currency to the digital permanent wallet of the recipient has already occurred. If the transfer has already completed (604, YES), then cancellation of the transfer is not possible and the cancellation attempt delivers an error (606) and ends.

Otherwise, the transfer has not already completed (604, NO). Based on receiving the indication (602) and on determining that the digital currency transfer has not already completed (604, YES), the process cancels (608) the digital currency transfer. The cancelling renders presentation of the transaction key ineffective to initiate completion of the digital currency transfer. In other words, the temporary key is made no longer useful for purposes transferring currency. This has an advantage in that it provides flexibility to void a transfer in case the initial transfer attempt becomes compromised or the transaction key is lost by the recipient.

Optionally, the recipient could be prompted to confirm the sender's attempt to cancel the transfer, if desired. This may be useful to prevent senders from cancelling a transfer immediately after providing the CPW and before the recipient scans the CPW.

The process then determines (610) whether to reinstantiate the transfer. In some examples, the indication that the digital currency transaction is to be voided can include an indicator of whether the transfer is to be reinstantiated. This may be useful in times when the parties still want the transfer to occur but, because of a lost CPW or other reason, another transaction key is needed. If reinstantiation is not to occur (610, NO), the process ends. Otherwise (610, YES), the digital currency transfer is to be reinstantiated using a new transaction key, and the process proceeds by establishing (612) a new digital currency transfer to transfer the specified type and amount of digital currency from the sender to the recipient. This has an advantage in that it provides flexibility to reinstantiate a transfer in case the digital currency is still due to be paid to the recipient, despite the initial transfer attempt being compromised or the transaction key lost.

One example of establishing the new digital currency transfer includes voiding the old transaction key and creating a new digital temporary wallet into which the currency is transferred. In this approach, a process creates a new digital temporary wallet having associated therewith a new transaction key, transfers the digital currency to the new digital temporary wallet and invalidates the (original) transaction key to render presentation of that transaction key ineffective to initiate completion of the digital currency transfer, and sends to the device temporary wallet information of the new digital temporary wallet, including the new transaction key. This approach for establishing the new digital currency transfer has an advantage in that security is heightened because all new constructs may be used.

Figure 7:
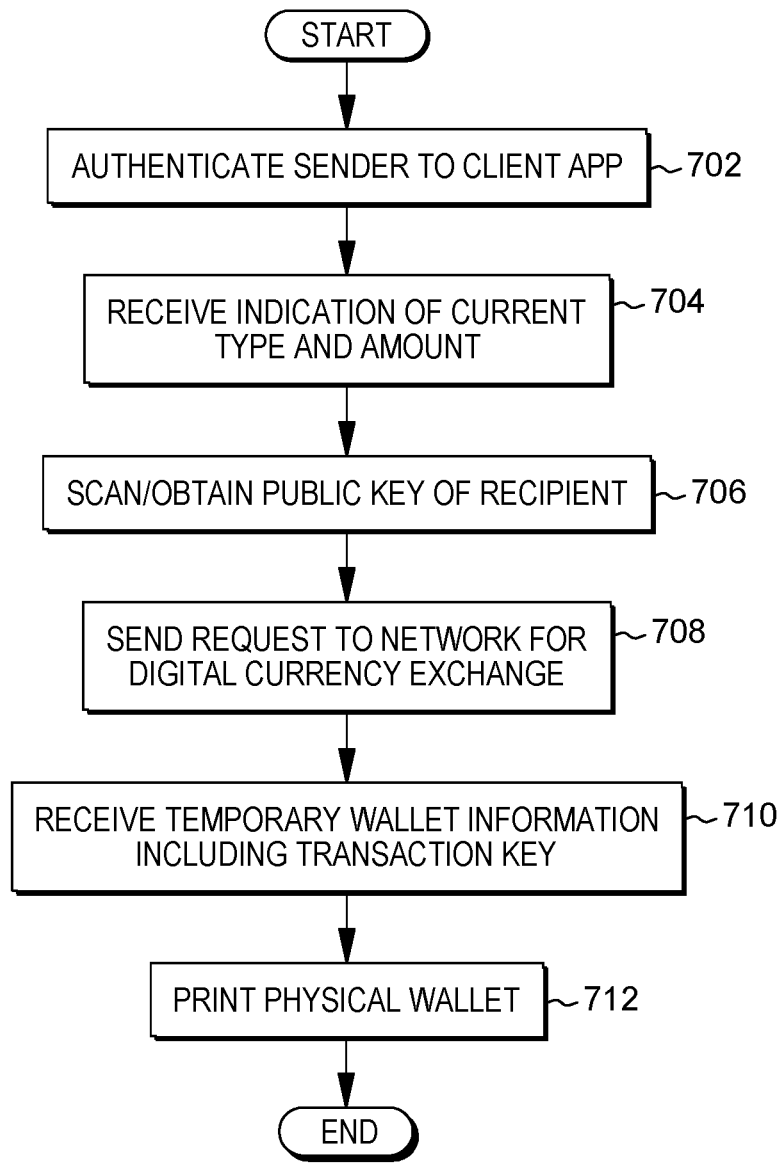
FIG. 7 depicts an example process of a sender device for a digital currency transfer, in accordance with aspects described herein.

FIG. 7 depicts an example process of a sender device for a digital currency transfer, in accordance with aspects described herein. In some examples, aspects of the process are performed by a computer system of a sender of digital currency. The process of FIG. 7 is the counterpart to the process of FIG. 4, directed to the server-side setup processing. The sender (user) authenticates (702) to the client device, for instance the client application. Authentication can take place by any desired means, such as fingerprint or other biometric information, two-factor authentication, voice recognition, facial recognition, and/or password verification as examples. The process receives (704) and indication of the type and amount of digital currency, and scans or otherwise somehow else receives/obtains (706) the public key of the recipient. The process sends (708) the request for digital currency transfer to the network/server. This is when the server-side processing of FIG. 4 may be triggered. Eventually, the network responds with the temporary wallet information. The client device receives (710) the temporary wallet information including the newly-created transaction key, and prints (712) the physical wallet.

Figure 8:
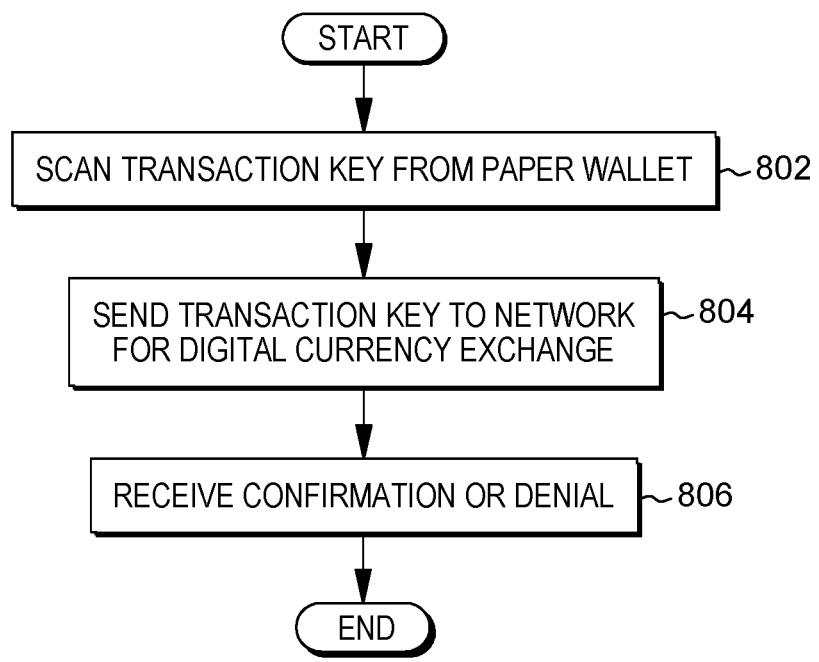
FIG. 8 depicts an example process of a recipient device for a digital currency transfer, in accordance with aspects described herein.

FIG. 8 depicts an example process of a recipient device for a digital currency transfer, in accordance with aspects described herein. In some examples, aspects of the process are performed by a computer system of a recipient of digital currency, meaning a computer system with which the recipient has authenticated. The process of FIG. 7 is the counterpart to the process of FIG. 5, directed to the server-side processing for redeeming a digital currency transfer. The process begins with the recipient device scanning (802) a transaction key from a physical wallet, and sending (804) that transaction key to (a server of) the network for digital currency exchange (112). This is when the server-side processing of FIG. 5 is triggered. Eventually, the network responds with confirmation of the transfer. The client device receives (806) the confirmation and the process ends.

Although various examples are provided, variations are possible without departing from a spirit of the claimed aspects.

Figure 9:
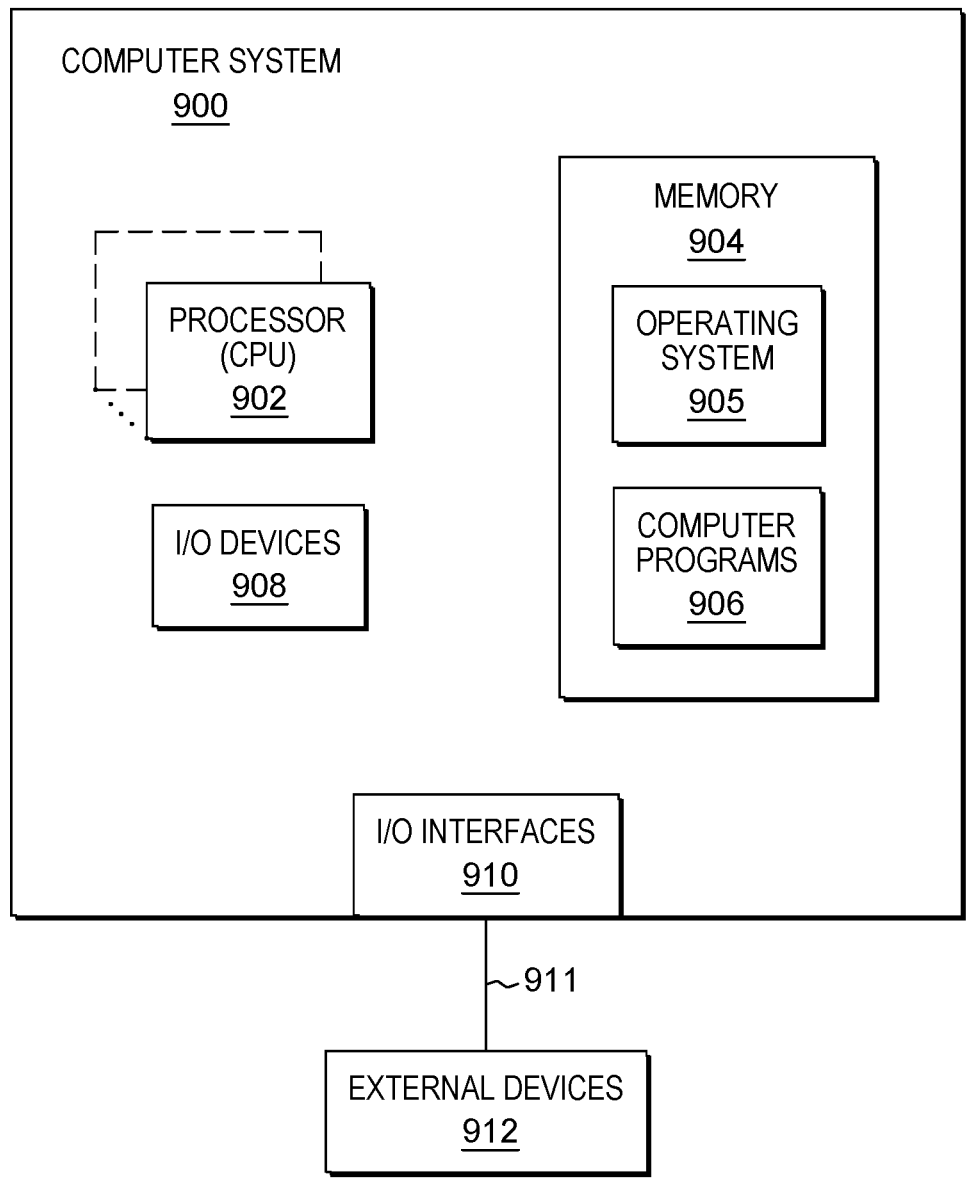
FIG. 9 depicts one example of a computer system and associated devices to incorporate and/or use aspects described herein.

Processes described herein may be performed singly or collectively by one or more computer systems, such as one or more sender devices, recipient devices, systems/servers of a network for digital currency exchange, or a combination of the foregoing, as examples. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g. Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically, programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. Computer system 900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
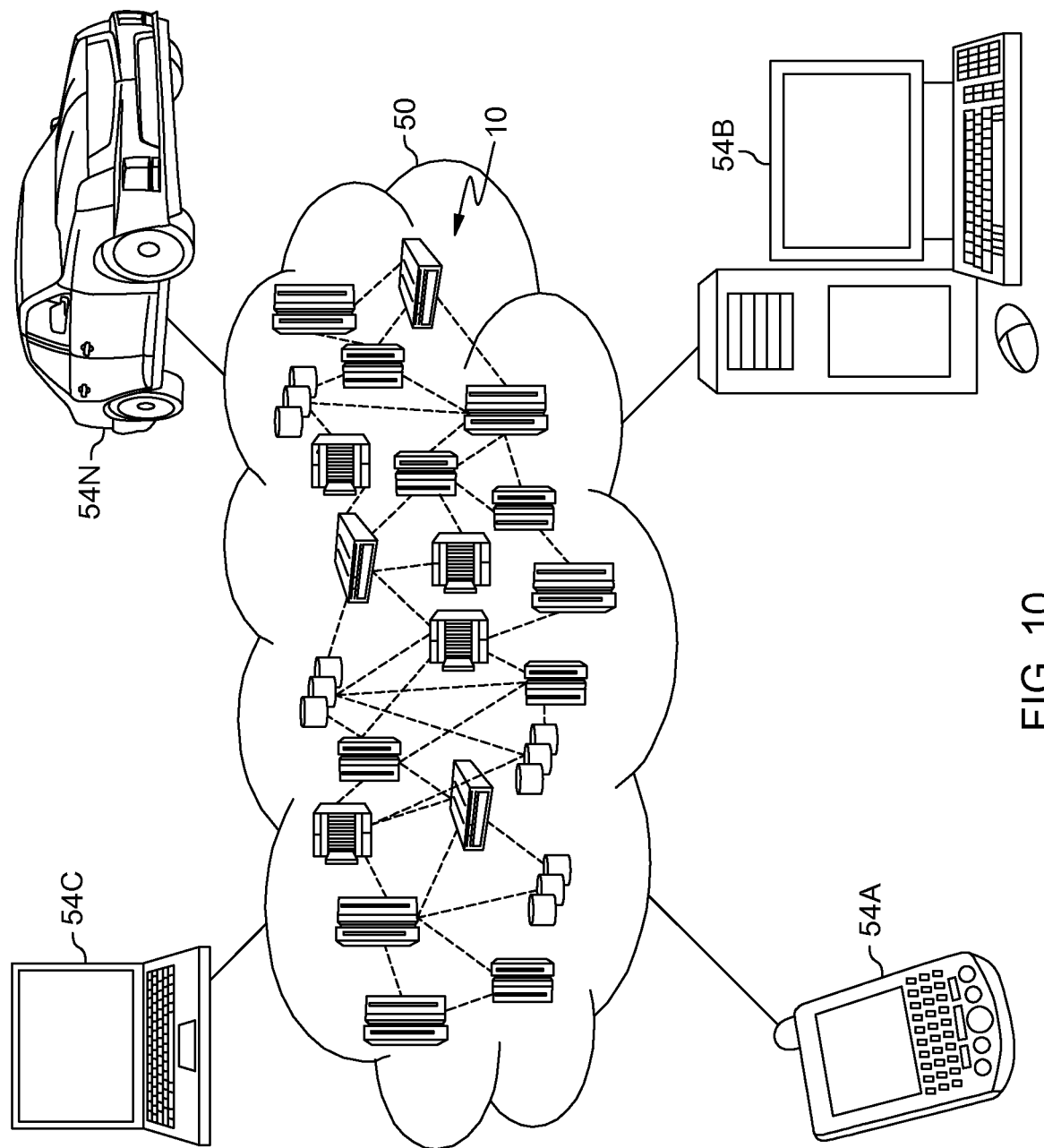
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
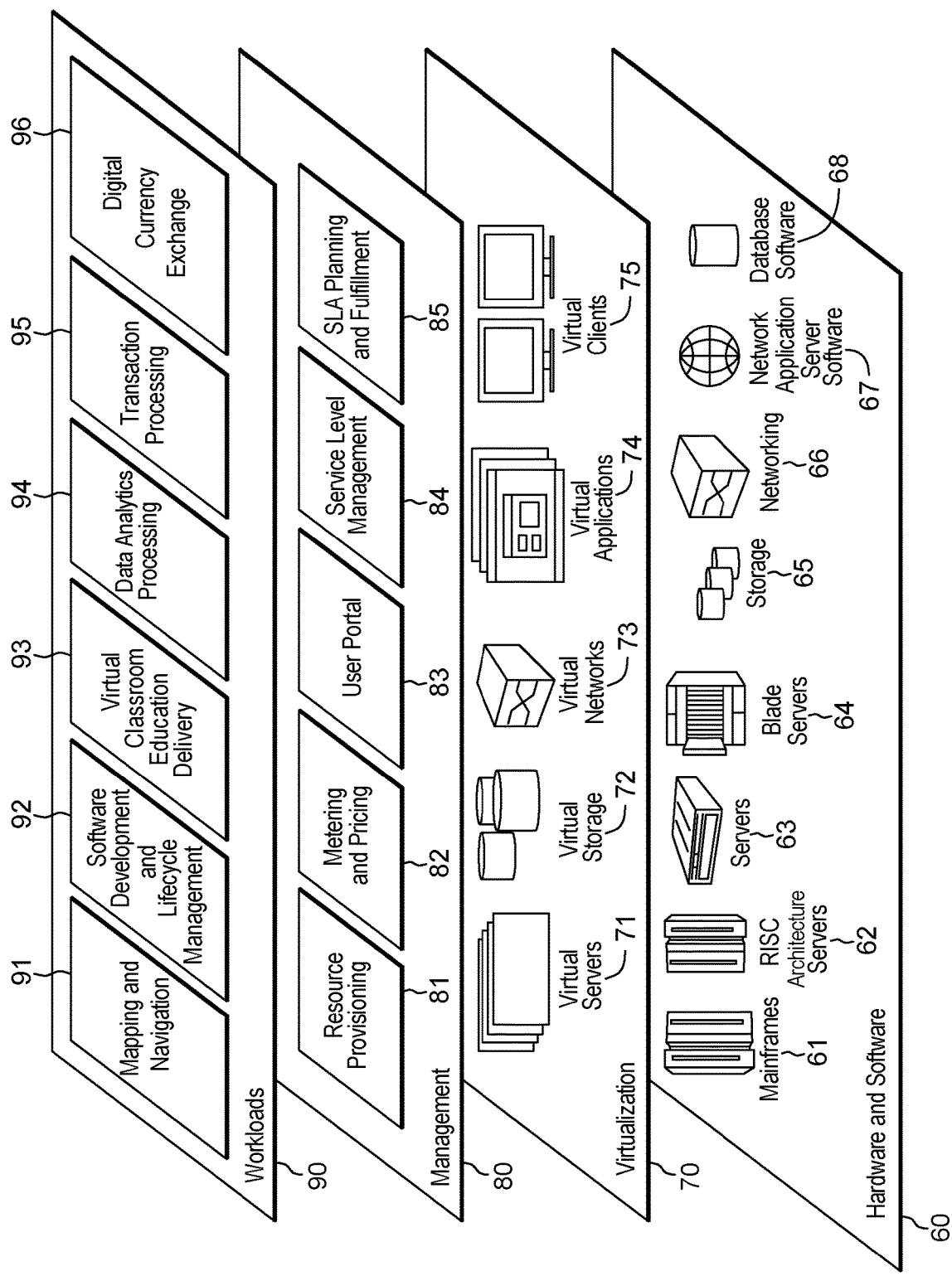
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital currency exchange 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving, from a device executing an application with which a sender of digital currency has authenticated as part of a digital currency transfer to a recipient, the sender and the recipient being registered on a network for digital currency exchange and the sender having a sender account and recipient having a recipient account, an indication of a specified type and amount of the digital currency to be transferred to the recipient as part of the digital currency transfer and a specified public key of the recipient, the public key of the recipient uniquely identifying a digital permanent wallet of the recipient account;
verifying that a digital permanent wallet of the sender account holds the specified type and amount of the digital currency to be transferred;
creating and storing, by a computer system, a digital temporary wallet to temporarily hold the digital currency to be transferred, the creating comprising creating, for the digital currency transfer, a transaction key that uniquely identifies the digital currency transfer, and associating with the created digital temporary wallet the transaction key, the public key of the recipient, and indicators of the specified type and amount of the digital currency;
transferring the digital currency of the specified type and amount from the digital permanent wallet of the sender to the digital temporary wallet; and
sending, to the device, temporary wallet information of the digital temporary wallet, the sent temporary wallet information comprising at least the transaction key, wherein the computer system is configured to receive the transaction key from a client device based on a scan of a printed physical wallet embodying the transaction key and on which the transaction key is printed, and complete the transfer of the digital currency to the digital permanent wallet of the recipient account, wherein the computer system maintains restriction of the completion of the transfer to the digital permanent wallet of the recipient account based at least on the association of the transaction key and the public key of the recipient with the created digital temporary wallet.

2. The method of claim 1, wherein associating the transaction key with the created digital temporary wallet locks the transaction key to the public key of the recipient such that completion of the transfer of the digital currency is possible only to the digital permanent wallet of the recipient account uniquely identified by that public key.

3. The method of claim 2, further comprising:
receiving a scanned transaction key from a client device as part of a request to complete the digital currency transfer;
correlating the received scanned transaction key to the transaction key uniquely identifying the digital currency transfer;
verifying that the recipient having the public key associated with the created digital temporary wallet has authenticated with an application of the client device from which the scanned transaction key was received; and
based on the verifying, transferring the digital currency of the specified type and amount to the digital permanent wallet of the recipient account uniquely identified by the public key.

4. The method of claim 3, wherein the verifying that the recipient has authenticated comprises verifying that the public key associated with the created digital temporary wallet matches to a public key of a user logged into the network via the application.

5. The method of claim 1, further comprising:
receiving, from the sender after authenticating to the network, an indication that the digital currency transfer is to be voided;
determining whether the digital currency transfer has already completed such that transfer of the digital currency to the digital permanent wallet of the recipient has already occurred; and
based on receiving the indication and on determining that the digital currency transfer has not already completed, cancelling the digital currency transfer, the cancelling rendering presentation of the transaction key ineffective to initiate completion of the digital currency transfer.

6. The method of claim 5, wherein the indication indicates that the digital currency transfer is to be instantiated again using a new transaction key, and wherein the method further comprises establishing a new digital currency transfer to transfer the specified type and amount of digital currency from the sender to the recipient.

7. The method of claim 6, wherein the establishing the new digital currency transfer comprises creating a new digital temporary wallet having associated therewith a new transaction key, transferring the digital currency to the new digital temporary wallet and invalidating the transaction key to render presentation of the transaction key ineffective to initiate completion of the digital currency transfer, and sending to the device temporary wallet information of the new digital temporary wallet, including the new transaction key.

8. The method of claim 1, wherein the network for digital currency exchange registers users for digital currency exchange, wherein each user has a respective account comprising a digital permanent wallet holding one more digital currencies, and wherein each such account is associated with a respective unique public key identifying the digital permanent wallet of the account.

9. The method of claim 1, further comprising storing to a ledger of the network a record of the digital currency transfer, the record including the transaction key, the public key, and a transaction time of the transaction, and indicating the specified type and amount of digital currency.

10. The method of claim 9, further comprising replicating the ledger to remote computer systems, wherein each of the remote computer systems is available to a client device to validate the digital currency transfer using the ledger replicated to the remote computer system.

11. A computer system comprising:
a memory; and
a processor in communication with the memory, wherein the computer system is configured to perform a method comprising:
receiving, from a device executing an application with which a sender of digital currency has authenticated as part of a digital currency transfer to a recipient, the sender and the recipient being registered on a network for digital currency exchange and the sender having a sender account and recipient having a recipient account, an indication of a specified type and amount of the digital currency to be transferred to the recipient as part of the digital currency transfer and a specified public key of the recipient, the public key of the recipient uniquely identifying a digital permanent wallet of the recipient account;
verifying that a digital permanent wallet of the sender account holds the specified type and amount of the digital currency to be transferred;
creating and storing a digital temporary wallet to temporarily hold the digital currency to be transferred, the creating comprising creating, for the digital currency transfer, a transaction key that uniquely identifies the digital currency transfer, and associating with the created digital temporary wallet the transaction key, the public key of the recipient, and indicators of the specified type and amount of the digital currency;
transferring the digital currency of the specified type and amount from the digital permanent wallet of the sender to the digital temporary wallet; and
sending, to the device, temporary wallet information of the digital temporary wallet, the sent temporary wallet information comprising at least the transaction key, receiving the transaction key from a client device based on a of a printed physical wallet embodying the transaction key and on which the transaction key is printed, and completing the transfer of the digital currency to the digital permanent wallet of the recipient account, wherein the computer system maintains restriction of the completion of the transfer to the digital permanent wallet of the recipient account based at least on the association of the transaction key and the public key of the recipient with the created digital temporary wallet.

12. The computer system of claim 11, wherein associating the transaction key with the created digital temporary wallet locks the transaction key to the public key of the recipient such that completion of the transfer of the digital currency is possible only to the digital permanent wallet of the recipient account uniquely identified by that public key.

13. The computer system of claim 12, wherein the method further comprises:
receiving a scanned transaction key from a client device as part of a request to complete the digital currency transfer;
correlating the received scanned transaction key to the transaction key uniquely identifying the digital currency transfer;
verifying that the recipient having the public key associated with the created digital temporary wallet has authenticated with an application of the client device from which the scanned transaction key was received; and
based on the verifying, transferring the digital currency of the specified type and amount to the digital permanent wallet of the recipient account uniquely identified by the public key.

14. The computer system of claim 11, wherein the method further comprises:
receiving, from the sender after authenticating to the network, an indication that the digital currency transfer is to be voided;
determining whether the digital currency transfer has already completed such that transfer of the digital currency to the digital permanent wallet of the recipient has already occurred; and
based on receiving the indication and on determining that the digital currency transfer has not already completed, cancelling the digital currency transfer, the cancelling rendering presentation of the transaction key ineffective to initiate completion of the digital currency transfer.

15. The computer system of claim 14, wherein the indication indicates that the digital currency transfer is to be instantiated again using a new transaction key, and wherein the method further comprises establishing a new digital currency transfer to transfer the specified type and amount of digital currency from the sender to the recipient, wherein the establishing the new digital currency transfer comprises creating a new digital temporary wallet having associated therewith a new transaction key, transferring the digital currency to the new digital temporary wallet and invalidating the transaction key to render presentation of the transaction key ineffective to initiate completion of the digital currency transfer, and sending to the device temporary wallet information of the new digital temporary wallet, including the new transaction key.

16. The computer system of claim 11, wherein the method further comprises:
storing to a ledger of the network a record of the digital currency transfer, the record including the transaction key, the public key, and a transaction time of the transaction, and indicating the specified type and amount of digital currency; and replicating the ledger to remote computer systems, wherein each of the remote computer systems is available to a client device to validate the digital currency transfer using the ledger replicated to the remote computer system.

17. A computer program product comprising:

a computer readable storage medium readable by a processing circuit and storing instructions for execution by the processing circuit for performing a method comprising:

receiving, from a device executing an application with which a sender of digital currency has authenticated as part of a digital currency transfer to a recipient, the sender and the recipient being registered on a network for digital currency exchange and the sender having a sender account and recipient having a recipient account, an indication of a specified type and amount of the digital currency to be transferred to the recipient as part of the digital currency transfer and a specified public key of the recipient, the public key of the recipient uniquely identifying a digital permanent wallet of the recipient account;

verifying that a digital permanent wallet of the sender account holds the specified type and amount of the digital currency to be transferred;

creating and storing, by a computer system, a digital temporary wallet to temporarily hold the digital currency to be transferred, the creating comprising creating, for the digital currency transfer, a transaction key that uniquely identifies the digital currency transfer, and associating with the created digital temporary wallet the transaction key, the public key of the recipient, and indicators of the specified type and amount of the digital currency;

transferring the digital currency of the specified type and amount from the digital permanent wallet of the sender to the digital temporary wallet; and sending, to the device, temporary wallet information of the digital temporary wallet, the sent temporary wallet information comprising at least the transaction key, wherein the computer system is configured to receive the transaction key from a client device based on a scan of a printed physical wallet embodying the transaction key and on which the transaction key is printed, and complete the transfer of the digital currency to the digital permanent wallet of the recipient account, wherein the computer system maintains restriction of the completion of the transfer to the digital permanent wallet of the recipient account based at least on the association of the transaction key and the public key of the recipient with the created digital temporary wallet.

18. The computer program product of claim 17, wherein associating the transaction key with the created digital temporary wallet locks the transaction key to the public key of the recipient such that completion of the transfer of the digital currency is possible only to the digital permanent wallet of the recipient account uniquely identified by that public key.

19. The computer program product of claim 18, wherein the method further comprises:

receiving a scanned transaction key from a client device as part of a request to complete the digital currency transfer;

correlating the received scanned transaction key to the transaction key uniquely identifying the digital currency transfer;

verifying that the recipient having the public key associated with the created digital temporary wallet has authenticated with an application of the client device from which the scanned transaction key was received; and based on the verifying, transferring the digital currency of the specified type and amount to the digital permanent wallet of the recipient account uniquely identified by the public key.

20. The computer program product of claim 17, wherein the method further comprises:

receiving, from the sender after authenticating to the network, an indication that the digital currency transfer is to be voided, wherein the indication indicates that the digital currency transfer is to be instantiated again using a new transaction key;

determining whether the digital currency transfer has already completed such that transfer of the digital currency to the digital permanent wallet of the recipient has already occurred;

based on receiving the indication and on determining that the digital currency transfer has not already completed, cancelling the digital currency transfer, the cancelling rendering presentation of the transaction key ineffective to initiate completion of the digital currency transfer; and establishing a new digital currency transfer to transfer the specified type and amount of digital currency from the sender to the recipient, wherein the establishing the new digital currency transfer comprises creating a new digital temporary wallet having associated therewith a new transaction key, transferring the digital currency to the new digital temporary wallet and invalidating the transaction key to render presentation of the transaction key associated therewith ineffective to initiate completion of the digital currency transfer, and sending to the device temporary wallet information of the new digital temporary wallet, including the new transaction key.

* * * * *